April 8, 1941.   P. W. THOMAS   2,237,798
TEMPERING MACHINE FOR WHEAT OR OTHER GRAIN
Filed March 13, 1939   8 Sheets-Sheet 1

INVENTOR.
PERCY W. THOMAS
BY U. S. Charles
ATTORNEY.

April 8, 1941.   P. W. THOMAS   2,237,798
TEMPERING MACHINE FOR WHEAT OR OTHER GRAIN
Filed March 13, 1939   8 Sheets-Sheet 2
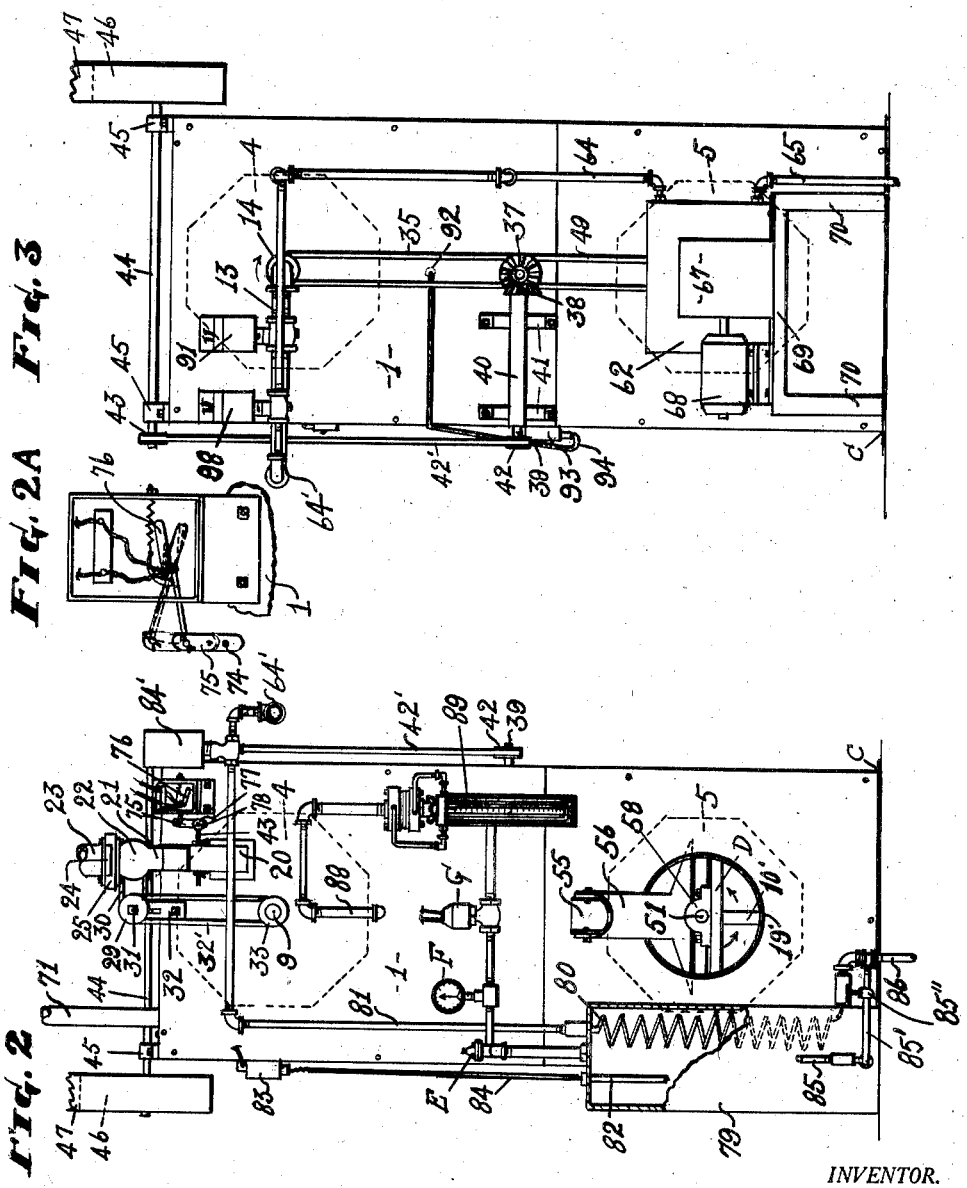
INVENTOR.
PERCY W. THOMAS
BY
U. G. Charles
ATTORNEY.

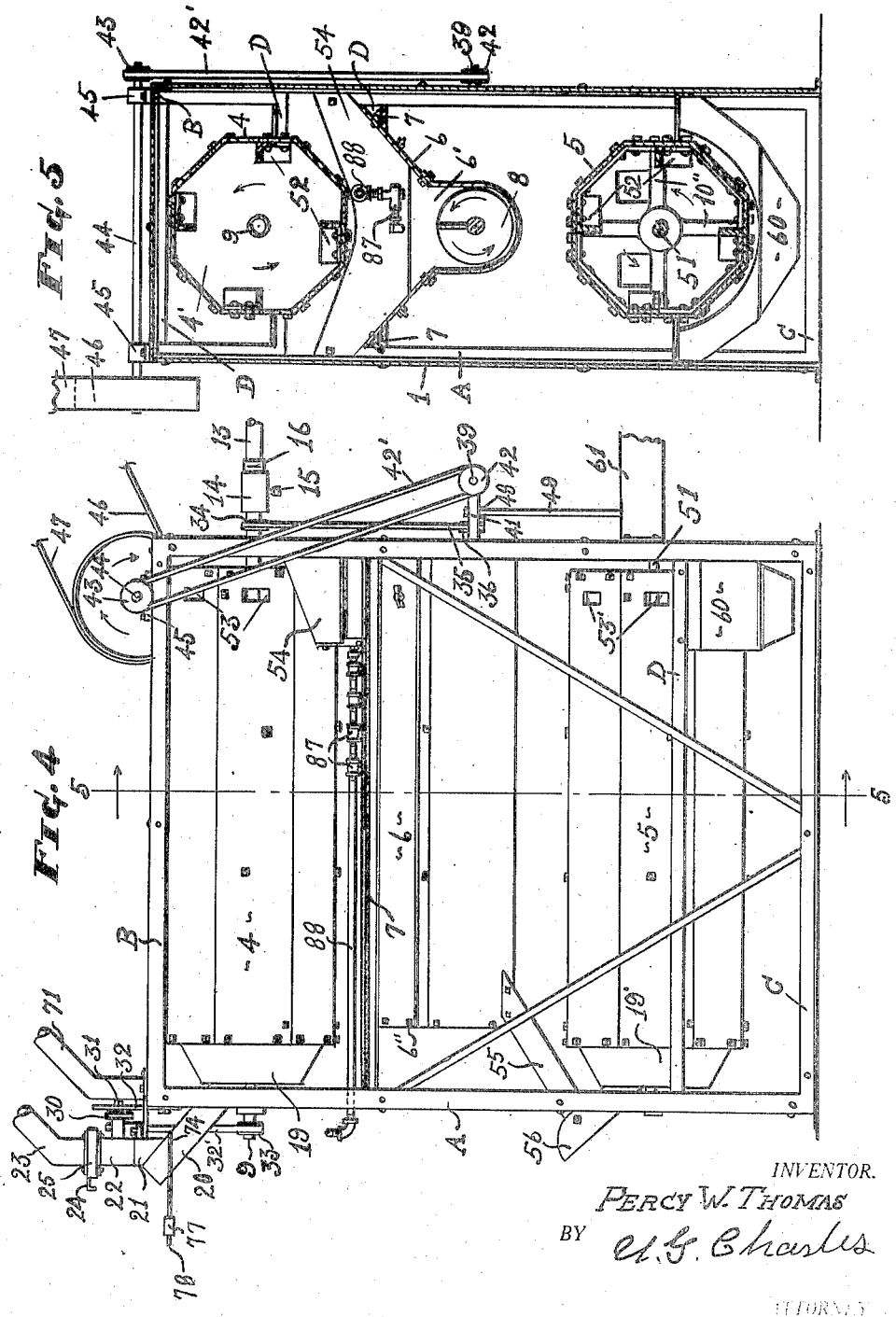

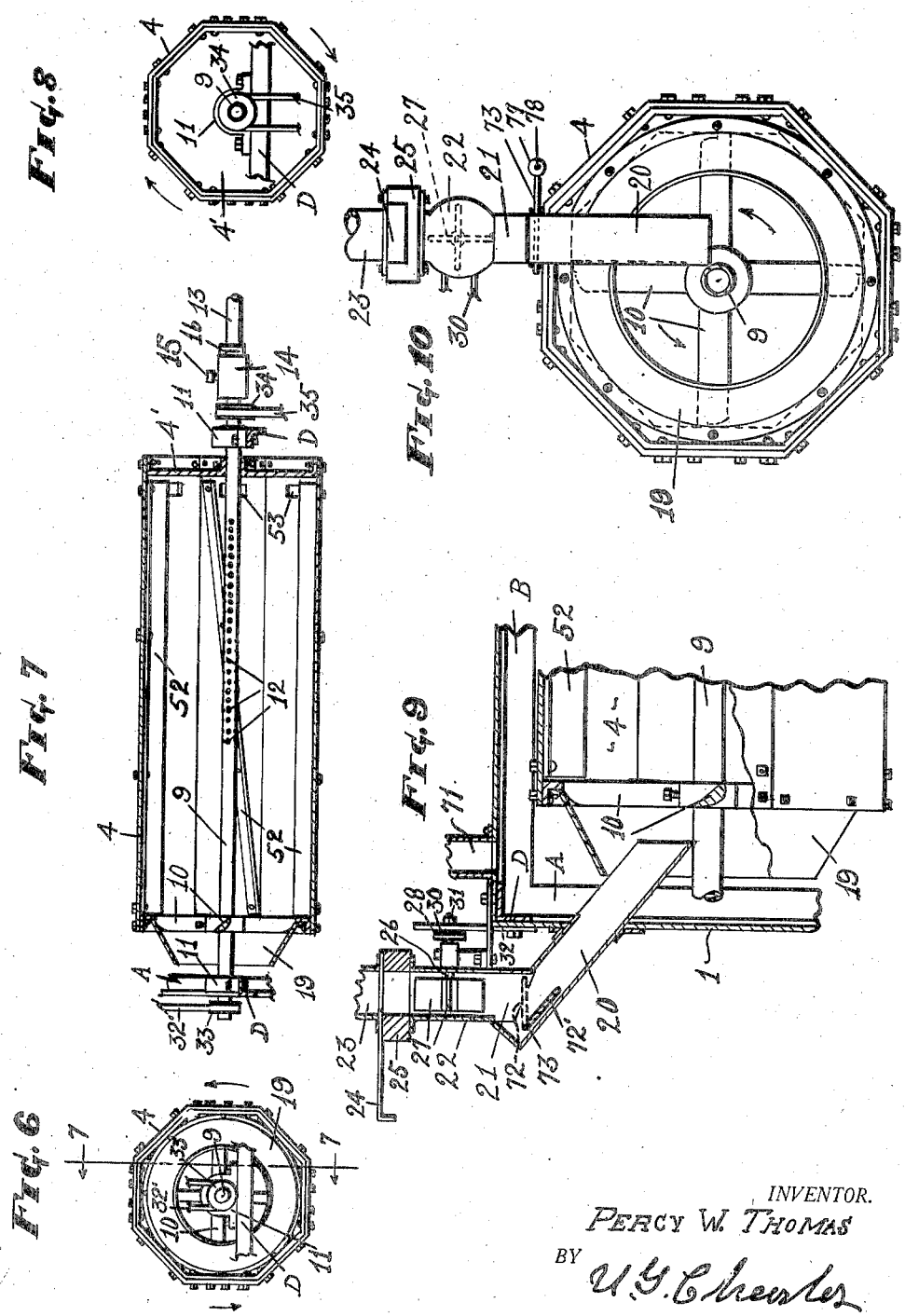

April 8, 1941.   P. W. THOMAS   2,237,798
TEMPERING MACHINE FOR WHEAT OR OTHER GRAIN
Filed March 13, 1939   8 Sheets-Sheet 5
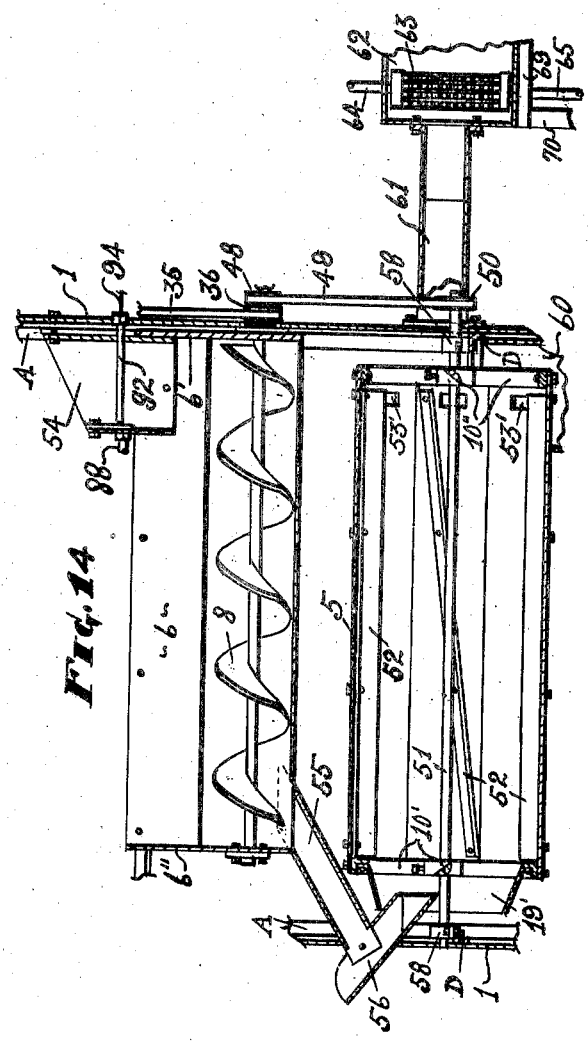
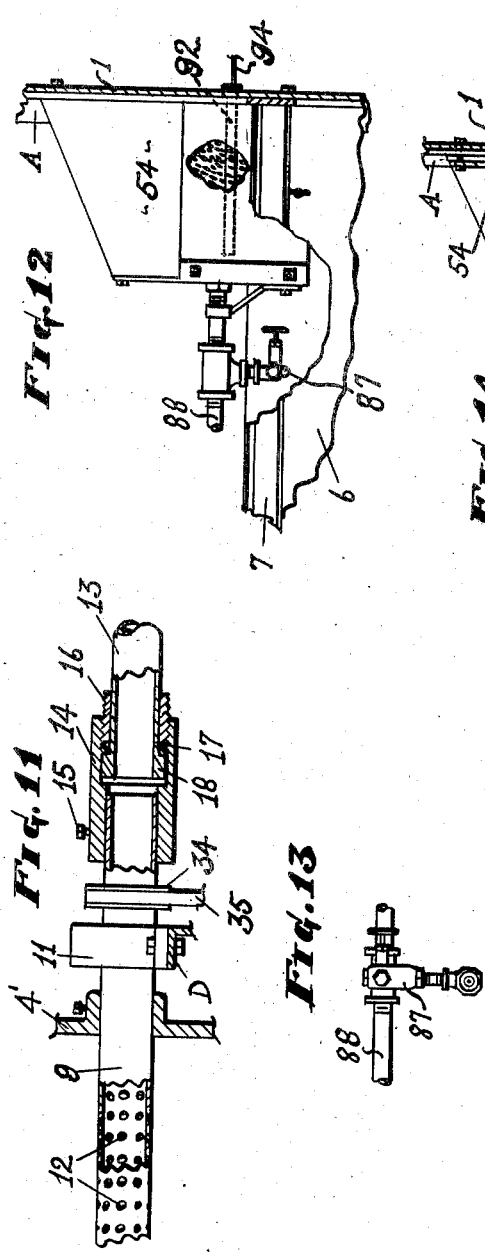
INVENTOR.
PERCY W. THOMAS
BY U. G. Charles
ATTORNEY.

April 8, 1941.    P. W. THOMAS    2,237,798
TEMPERING MACHINE FOR WHEAT OR OTHER GRAIN
Filed March 13, 1939    8 Sheets-Sheet 6
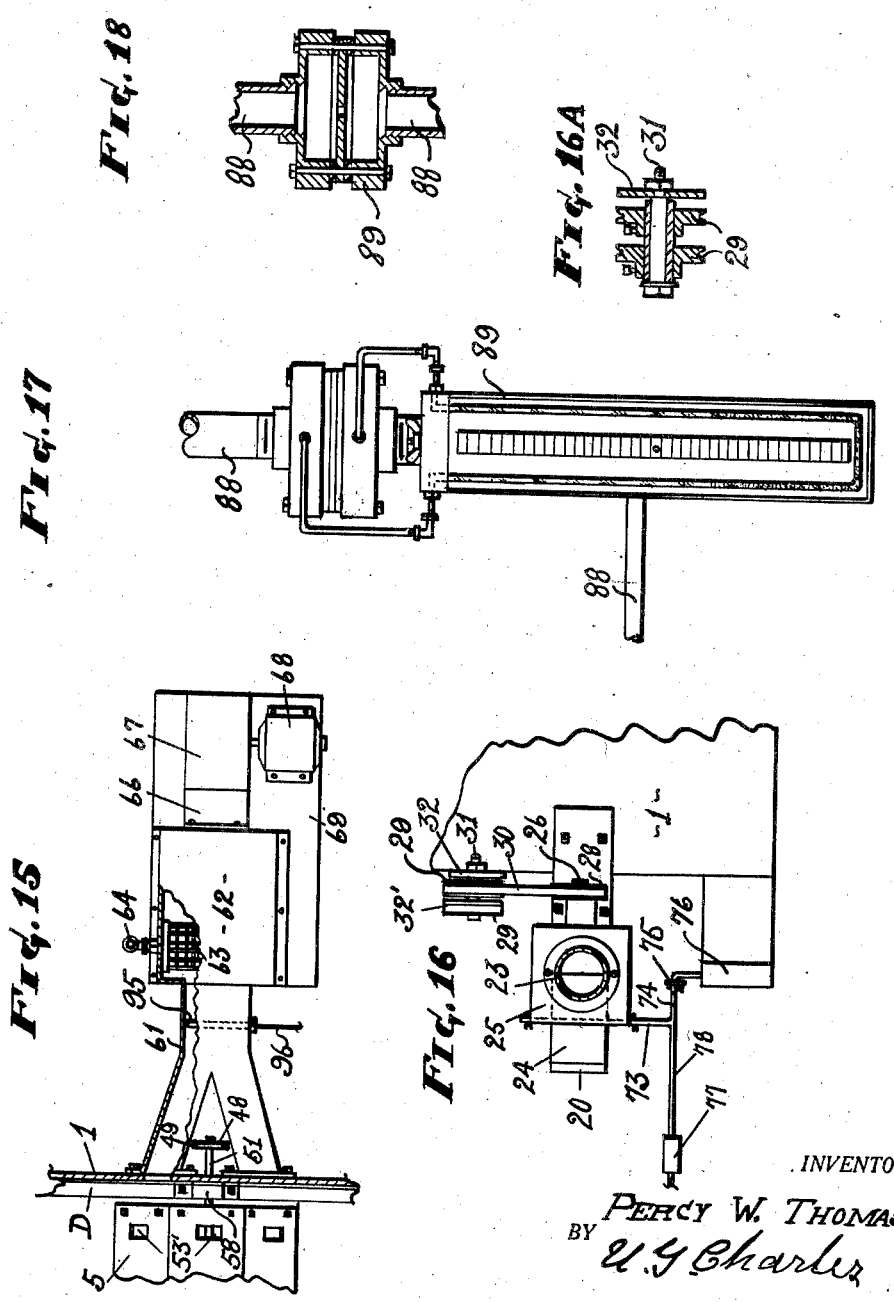
INVENTOR.
PERCY W. THOMAS
BY U. Y. Charles
ATTORNEY.

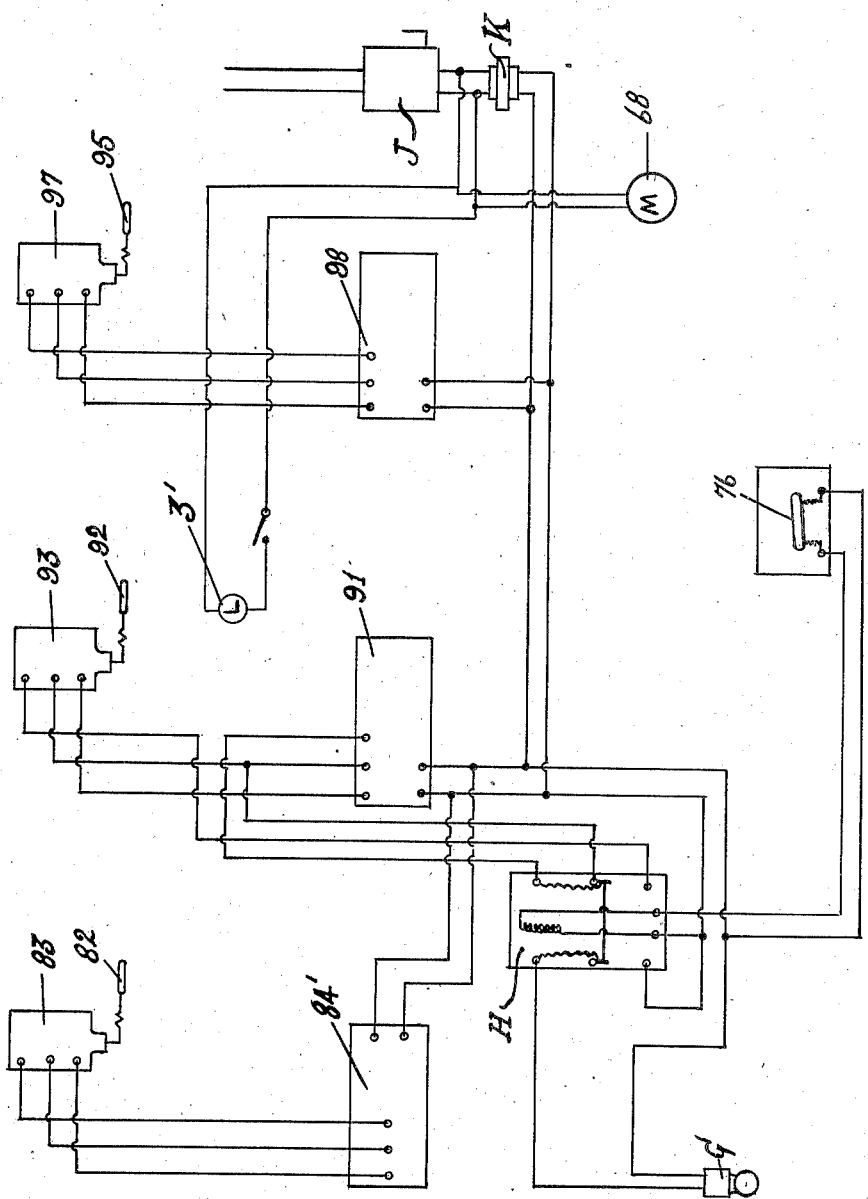

April 8, 1941.                P. W. THOMAS                    2,237,798
             TEMPERING MACHINE FOR WHEAT OR OTHER GRAIN
                    Filed March 13, 1939         8 Sheets-Sheet 8
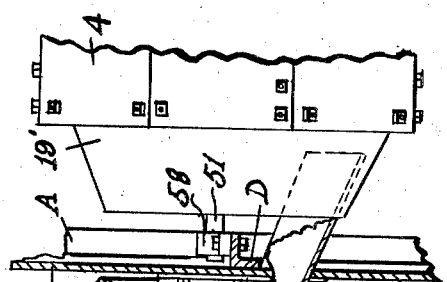
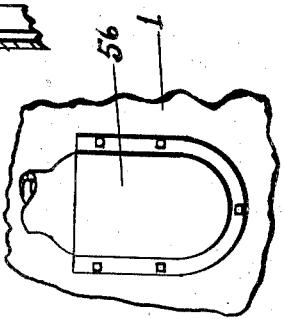
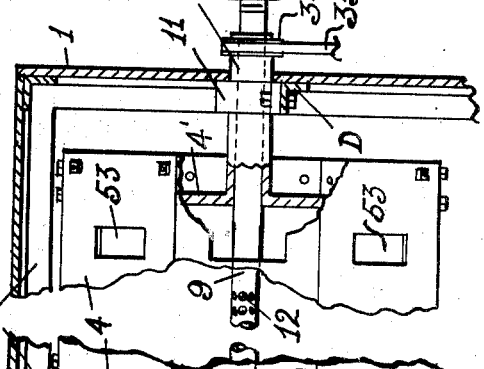
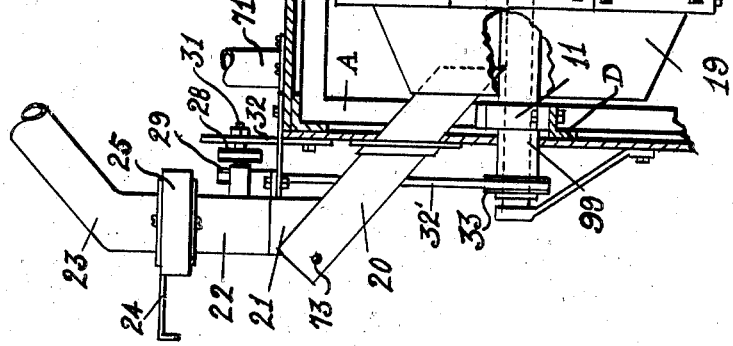
INVENTOR.
PERCY W. THOMAS
BY U. Y. Charles
ATTORNEY.

Patented Apr. 8, 1941

2,237,798

UNITED STATES PATENT OFFICE 2,237,798

TEMPERING MACHINE FOR WHEAT OR OTHER GRAIN

Percy W. Thomas, Wichita, Kans.

Application March 13, 1939, Serial No. 261,569

1 Claim. (Cl. 83—28)

My invention relates to new and useful improvements in a tempering machine for wheat or other grain, and has for its principal object an arrangement whereby moisture is introduced in an effective and efficient way to the hull of wheat grains or other flour-meal-producing grain so that the grain will be in the best possible condition for grinding and screenings.

A further object of my invention is to provide a machine having a series of coacting elements for a continuous and efficient treatment for wheat step by step as it flows therethrough, the purpose of which is to properly temper the wheat for grinding as it leaves the machine.

A still further object of my invention is to provide an efficient means to introduce moisture uniformly through a body of wheat and evaporate the surplus moisture externally carried by the grain as conducted through the machine, the said moisture and evaporating means being automatically controlled with respect to a predetermined temperature.

A still further object of my invention is to produce a machine compact with respect to its component parts and the floor area required to install the machine; and the said machine may be located in working relation to the grinding element of a flour producing plant.

A still further object of my invention is to provide a wheat tempering machine that will automatically carry out a process of tempering wheat by a means to introduce moisture at a predetermined temperature, and means to govern the temperature, and means to set the machine with respect to an analyzed condition of the grain. In other words, the control insures that, regardless of entering temperature of the wheat, it will leave the first treating container at a temperature decided upon by the miller, who will set this temperature upon the steam controller scale. A still further object of this invention is to provide a machine that will speedily temper the grain over the time heretofore accomplished and with equal efficiency, in other words, a continuous flow of grain from the machine into the grinding process may be accomplished.

These and other objects will hereinafter be more fully explained, reference being had to the accompanying drawings forming a part of this specification, and in which like characters will apply to like parts in the different views.

Referring to the drawings:

Fig. 2 is an elevation of the left hand end of Fig. 1.

Fig. 2A is an enlarged view of the mercury switch.

Fig. 3 is a right hand end elevation of said Fig. 1.

Fig. 4 is a front elevation of the machine with its respective side of the casing removed, and other parts removed for convenience of illustration.

Fig. 5 is a sectional view taken on line 5—5 in Fig. 4.

Fig. 6 is a view of the intake end of the upper drum.

Fig. 7 is a sectional view taken on line 7—7 in Fig. 6.

Fig. 8 is an end view of the drum opposite to that shown in Fig. 6.

Fig. 9 is an enlarged fragmentary view at the intake of the upper drum, partly in section and parts removed for convenience of illustration.

Fig. 10 is an end view of Fig. 9, the casing removed.

Fig. 11 is an enlarged detail of the steam pipe and connection upon which is mounted the upper drum, the head of said drum sectionally shown fragmentarily.

Fig. 12 is a view of the water spray extending into the auger hopper, parts removed for convenience of illustration.

Fig. 13 is an underside view of the spray nozzle.

Fig. 14 is a front view of the auger, its hopper and lower evaporating drum, radiator, and its duct connection to said drum, sectionally shown.

Fig. 15 is a plan view of the air conditioner as connected to the evaporating drum through the medium of the duct shown in Fig. 14.

Fig. 16 is a plan view of the grain control at the intake end of the upper drum, parts removed for convenience of illustration.

Fig. 16A is an enlarged sectional view of the spindle arrangement for the pair of sheaves shown in Fig. 16.

Fig. 17 is a side view of the manometer associated with the spray nozzle.

Fig. 18 is an internal view of the upper end of the manometer.

Fig. 19 is a wiring diagram of the electric control for the tempering process.

Fig. 20 is a modification showing the hollow apertured shaft stationarily retained, and on which the drum will rotate.

Fig. 21 is a modification of the lower drum chute arrangement.

Fig. 22 is a front view of said chute.

Figure 1:
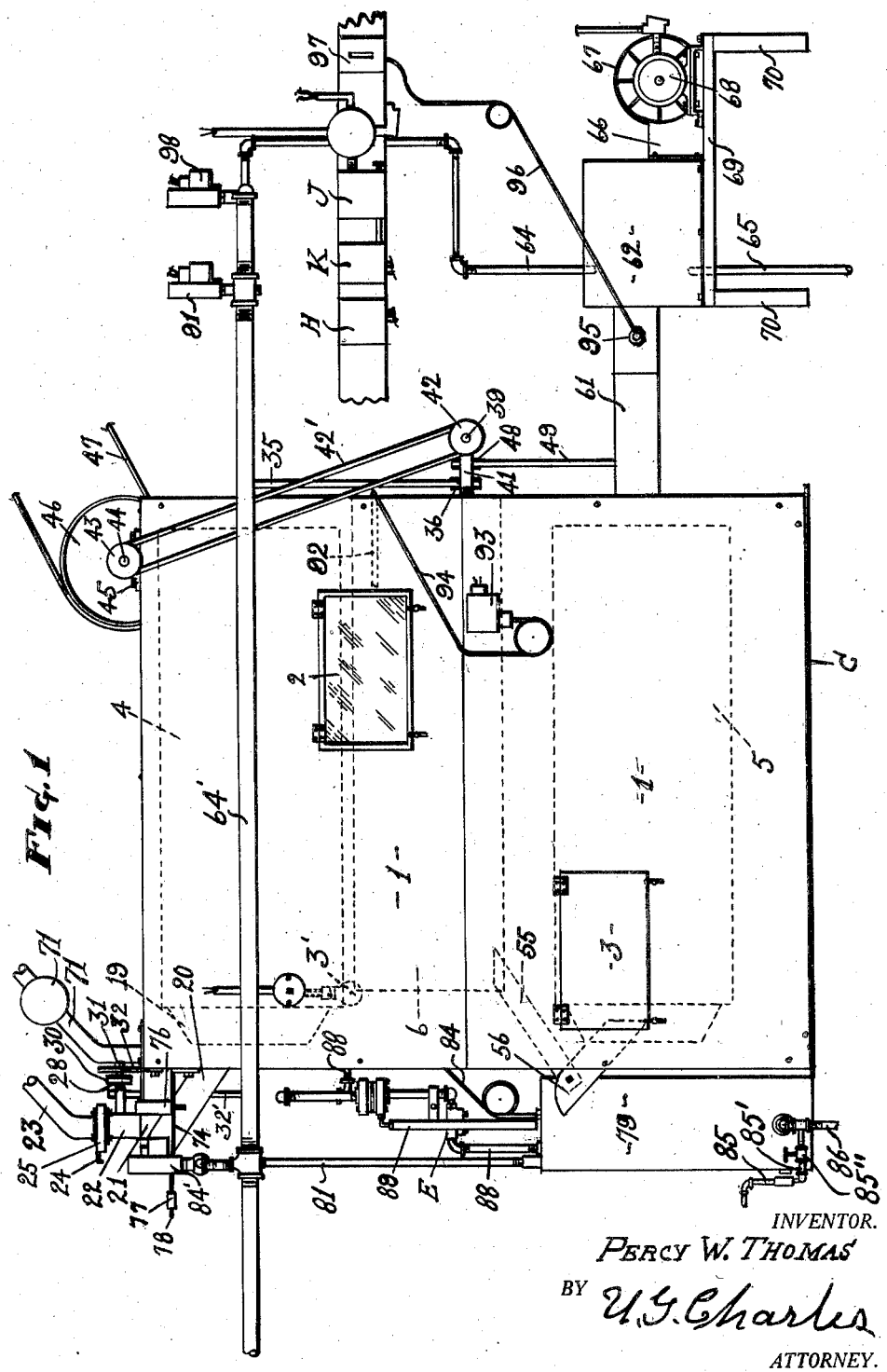
Fig. 1 is a front elevation of the machine.

The mechanism of the invention herein disclosed consists of a casing 1 rectangular in cross section, and being equipped with an observation window 2 and a hingedly connected door 3, each of which are positioned in the front wall of said casing convenient to the spray nozzle at the intake end of the auger feed end of the lower drum, said auger, spray nozzle and drum later described, and a similar door and window are correspondingly positioned in the opposite wall of the casing for like purpose, it being understood that the interior of the casing is illuminated by a lamp, as shown by dotted lines 3' in Fig. 1. The casing, preferably made of sheet metal, is supported by an appropriate frame consisting of angle members A, positioned in the vertical corners of the casing, and being joined at the upper ends by similar members B, and likewise the lower ends of said corners as at C, and other members medially and horizontally positioned as at D in the casing as reinforcing means therefor and supporting means for the tempering elements within said casing as follows:

Trunnioned at the upper end of said casing is a drum 4 and a similar drum 5 trunnioned in the lower end of the casing. Between said drums is a hopper 6 pendantly carried by angle bars 7, the ends of which are secured to their respective reinforcing members D, one end of said hopper as at 6' being joined snugly to its respective end of the casing, while the other end terminates inward a spaced distance from its respective end of the casing, and being closed by an end wall 6''. The side walls of the hopper converge downward and are joined to a bottom arcuate in form with respect to cross section to receive an auger 8 with a smooth running fit therein, later described.

Drum 4, being hollow, is a wheat receiving element and is carried by a hollow shaft 9 axially positioned and extending through head 4', while the other end is secured to radially positioned spokes 10, said shaft being trunnioned in suitable bearings 11 that are secured to the component parts of the casing, as shown in Figs. 6 and 8. The said shaft 9 has a series of apertures 12 spaced therealong and around, through which low pressure steam vapor will eject, said apertures being directed outward and slanting toward the open or receiving end of the drum, so that the current of the steam and the inward flow of wheat or other grain will meet each other as the drum rotates, and the said shaft passing outward from the closed end of the drum and beyond its respective bearing is equipped with a union to receive the end of a steam pipe 13, rotatably connected, the union consisting of a nipple 14 slidably fitting on the shaft steam tight, and being secured by a set screw 15, while the outer projecting end of said nipple is reamed and threaded internally to receive a threaded packing gland 16 to compress a packing substance 17 between the inner end of said gland and shoulder 18, formed on the inner end of the steam pipe 13, said pipe being fed by a source of steam later described.

The spokes at the receiving end of said drum 4 and slantingly positioned with respect to cross section as conducting means inward for wheat entering the drum end arrangement, and the said drum has an annular funneled flange 19 extending outward as receiving means for the wheat as it enters the same through a conductor chute 20 extending therein. The said chute is adapted to communicate with the neck 21 of a flutter wheel housing 22, said housing communicating with a pipe 23 as a conductor for wheat to the tempering machine, the flow of which is controlled by a gate 24 slidable across the end of said pipe, and being guided by a block 25 having a suitable slot therein to conform to the gate, the block being the connecting medium between said pipe and flutter wheel housing.

Trunnioned in housing 22 is a flutter wheel comprising a shaft 26 having radially positioned blades 27 secured thereto, said blades adapted to sweep the walls of the housing with a close running fit, functioning as a control for uniform flow of the wheat into said drum 4, and the said shaft has on the outer end thereof a sheave 28, and being connected to a similar sheave 29 through the medium of a belt 30, there being a pair of last said sheaves secured in close proximity and rotatable on a spindle 31 that is adjustably carried by a slotted bracket 32. The other sheave of last said sheaves is connected through the medium of a belt 32' to a sheave 33 that is secured to the outer end of the said hollow shaft 9 of drum 4 as turning means for said flutter wheel, and the said drum 4 has a sheave 34 on the other end as rotating means therefor through the medium of a belt 35 that is connected to a sheave 36 secured to the said auger shaft. The said auger shaft has on its outer extremity a bevel gear 37 in mesh with a similar gear 38 secured to a shaft 39 that is trunnioned in a sleeve 40 secured to the casing by suitable hangers 41, said shaft having a sheave 42 attached on the other end thereof and being connected through the medium of a belt 42' to a sheave 43 that is secured to a shaft 44 trunnioned in suitable bearings 45 on the top of said casing, and the last said shaft has a pulley 46 on the other end thereof as actuating means for its respective shaft through the medium of a belt 47 that extends to a source of power not shown in the drawings.

The said auger shaft has another sheave 48 secured thereto adjacent sheave 36, said sheave 48 functioning as a power transmitting means to turn the lower drum 5 through the medium of a belt 49 connected to a sheave 50 attached to a shaft 51 of said drum.

It will now be seen that the sheave connection above described will function to assist in carrying out the process of tempering grain (wheat preferred). Furthermore, while I have shown and described sheaves and belts, the same may be substituted by chain belts and sprockets, at the discretion of the manufacturer, or plain belting and pulleys may be substituted.

The said upper and lower drums 4 and 5 are polygonal in form with respect to their peripheral walls, as such form has a greater efficiency to tumble and stir the wheat contained therein, and furthermore, the alternate polygonal sides each have an L-shaped bar 52 extending from end to end of said drums, positioned correspondingly and secured so that one leg of each member will extend inward radially of the drums to assist for a greater mix and tumbling, and also to incline the movement of the grain longitudinally of the drums to an exit as the drum rotates.

It will now be seen that wheat entering the open end of drum 4 will be steamed as it moves toward the other end thereof, at which point the wheat moves outward through openings 53 aligned peripherally and medially positioned in each of said polygonal sides. Furthermore, I have arranged a chute 54 carried by the casing and end of the auger hopper adjacent thereto. Said chute 54, as positioned, will function as a funnel to conduct the wheat into the auger as conveying means therefor to the other end of the auger hopper, at which point a spout 55 is connected, extending outward and downward to discharge in a chute 56 as a conductor for said wheat into said drum 5, it being understood that said drum has a funneled end and spokes similar to that described for the corresponding end of drum 4, and being identified by numerals 19' and 10' respectively, while the other end of the drum has similar spokes 10'' and positioned in like manner with respect to their inward slant to avoid wheat passing outward as the drum rotates. It will be seen that this end of the drum is open, through which a current of air will flow by mechanical draft later described.

The said bottom drum 5 is trunnioned in the casing by the solid shaft 51 axially extending therealong and having suitable bearings 58, and the last said drum has similar exit openings 53' similar to that described for drum 4, and communicating with a chute 60, functioning as an exit for the wheat passing out of the machine as tempered thereby.

It will be understood that the end of said lower drum 5 adjacent its chute 60 is positioned in close proximity with the wall of the casing, but spaced therefrom sufficient to avoid contact in its rotation, and being open and so positioned is means to connect an air conditioner consisting of a bifurcated duct 61, the legs of which terminate at the casing wall, each being in registry with their respective openings formed in the casing, said openings to communicate with the interior of the drum oppositely with respect to the diametrical axis thereof, by which means distribution of the current is had while passing through and outward at the other end of said drum, and the said duct is connected to a chamber 62 in which is positioned a radiator 63 heated by steam conducted therein through a pipe 64, extending from the main line 64' that is fed by a steam plant (said plant not shown in the drawings), and outward through a return 65 as circulating means for the steam through the radiator as a heater for the circulated air.

Connected to the outer end of said chamber is a duct 66 through which air from a fan 67 will enter the chamber and exhaust outward therefrom through the radiator and bifurcated duct, said fan being actuated by an electric motor 68, substantially as shown in Figs. 1 and 3, and said fan, motor, and chamber being carried by a platform 69 having suitable legs 70 as supporting means therefor.

Positioned on the top of the casing adjacent the intake end of drum 4 is an exhaust pipe 71 communicating with the interior of said casing, through which sediment accumulation will exhaust by suction mechanically produced by an appropriate means, the means not shown in the drawings, except diagrammatically shown in Fig. 1 as at 71'.

The mechanism of the machine herein disclosed structurally is capable of tempering wheat continuously moving therethrough, there being an electric current to energize and control the executive elements of the process, the current for which is automatically brought into action by the flow of wheat through a chute 20 communicating with the upper drum 4, there being positioned in said chute a rockable plate 72 adapted to close said chute during an idleness period of the machine, said plate being shown in an inoperative position by dotted lines 72'. The said plate is pivotally carried at one end thereof by a rod 73 extending through the wall of the chute, and has a crank 74 formed on the outer extension of the rod, the crank having a link 75 to connect the same with a rockable switch tube 76, in which a pair of electrodes extend adjacent the pivot point, said electrodes being insulated from each other, said switch being shown in an operative position by solid lines in Fig. 2—A while its inoperative position is shown by dotted lines. The said switch consists of a hollow glass or porcelain tube with a charge of mercury therein, the quantity of which is sufficient to submerge the said electrodes simultaneously when the outer free end of the tube is rocked upward to cause the mercury to flow to the inner end of said tube 76 as shown in Fig. 2A, closing the circuit to cause operation of a relay switch H which in turn controls the water service to the auger and steam service to the upper drum, the switch closing means being gravity actuated by wheat engagement upon the plate 72 while flowing through the chute, the position of which is shown by solid lines 72 in Fig. 9, and when disengaged by the flow of wheat, said plate is retracted to its normally closed position for the chute by a counterbalance 77, adjustably carried on an arm 78 extending transversely from the plate shaft.

In Figs. 1 and 2 is shown a hot water tank 79 having a steam heating coil 80 positioned therein as shown in Fig. 2, said coil being connected to a steam lateral pipe 81 that is supplied by the said main line 64', and the said hot water tank has a control temperature bulb 82 extending therein and being connected to a temperature controller 83 by a capillary cable 84 as actuating means for said controller to maintain a predetermined temperature of the water contained in said tank through the medium of a steam controlling valve 84' that is automatically controlled by the temperature of the water in said tank to increase or decrease the steam pressure in said heating coil, whereby uniformity of the water temperature is maintained, said water being supplied through a pipe 85 extending to a pressure source of supply, the latter not being shown in the drawings, and the said steam coil having a pipe 86 at the lower extremity thereof as a return to the source of steam supply, whereby circulation of the steam is had. It will be seen that a lateral pipe 85' extends from said pipe 85 connecting with the steam return pipe 86 and controlling check valve 85'' functioning as a drain for the water in said tank 79 when the system is disengaged from its water and steam supply.

In Fig. 4 is shown a plurality of spray nozzles 87 adjacent the intake end of the auger, said nozzles being supplied by a water pipe 88 having positioned thereon the elements in their order, starting from said tank, namely, first a water pressure regulator E, second a pressure gauge F, third a solenoid valve G to control the flow of water at the time when plate 72 is rocked by the flow of the wheat, previously described, and fourth a manometer 89 to ascertain the quantity of water dispensed by the spray nozzles, and being subject to the predetermined quantity of water governed by the said regulator E. This arrangement will insure that each individual grain of wheat receives its quota of moisture as sprayed by said nozzles, and the water is applied at a controlled temperature suitable to and related to the temperature of the wheat being sprayed, the water being measured in relation to the wheat feed rate, in pounds per minute, or in a known rate of feed in per cent of added moisture, the said auger 8 to function as a conveyor for the grain through the spray a short distance and from thence onward, tumbling the grain to obtain uniformity of the application of the water to the individual grains of the wheat while moving onward and into drum 5 for the purpose later described.

Positioned on steam lateral pipe 13 is a steam controlling valve 91, said valve arranged to control the steam passing outward through the apertures of shaft 9 as a means to raise a desired temperature of the wheat contained in the drum, which in its rotation will agitate by tumbling the grain to insure the steam vapor uniformity of contact with the grain of the wheat as it passes through and outward as above described. Inasmuch as the wheat must arrive at the feed end of the auger at a predetermined temperature, the same is controlled by a bulb 92 over which the wheat will flow, as shown in Fig. 12, by which means the bulb will act upon a temperature controller 93, through the medium of a capillary cable 94; said controller 93 in turn acts upon valve 91 to govern the flow of steam as it enters the drum.

To maintain a predetermined temperature of the air entering drum 5 there is positioned within the body of said duct 61 a bulb 95 having a capillary cable 96 to connect said bulb with a temperature controller 97 which in turn will control the flow of steam by acting upon controlling valve 98 to vary the temperature of the air circulating through the said air conditioner by which means superfluous moisture is evaporated from the wheat externally, which, in turn, will cool the grain to milling temperature by evaporative refrigeration.

It will be understood that all of said valves, temperature controls, bulbs, and circuit closing controlling switches are of standard make and adapted to perform the service required in tempering grain as herein set forth, the principle of which is to treat each and every individual grain in its course of travel through the machine, and furthermore, the motor has a variable speed regulator (said speed regulator not shown in the drawings) as discharging means of conditioned air in controlled amounts impinging the individual grains of wheat as suspended by said drum 5.

It will be seen that the relay switch H is electrically connected to the mercury switch tube 76, steam controlling valves 84', 91, and 98, and the solenoid valve G, and at the time of opening the conductor gate 24 wheat by gravity will contact the rockable plate 72 on its path to the upper drum, said plate in turn will tilt the switch tube 76 whereby a circuit is closed to operate the relay switch H, by which means circuits are closed for the steam controlling valves 84', 91, and 98, and solenoid valve G, at which instant, the steam to the heating coil 80, to the upper drum, and to the air conditioner, and water to the auger respectively will be turned on, and should the flow of wheat discontinue the said feed plate 72 will retract upward, which in turn, will reverse the position of switch tube 76, breaking the circuit to relay switch H, at which instant, the circuits to the steam controlling valves and solenoid valve G are broken. It will be further understood that the steam controlling valves 84', 91, and 98 may be of a type K200 manufactured by the Minneapolis-Honeywell Regulator Company at Minneapolis, Minnesota, while the temperature controllers may be under the same trade-mark and bearing number T413, and the relay switch and solenoid valve are of any conventional type and may be purchased from said named company.

In Fig. 20 is shown a modification of mounting drum 4 in its bearings 11 by a hollow hub 99 secured to each end of the drum, and through which the perforated shaft 9 will extend and remain stationary as the drum turns, by which means said shaft 9 is connected to its steam pipe 13 by a coupling 100. It will now be seen that the said shaft is free from carrying the load of the drum as it extends loosely through the hubs 99 of said drum that are trunnioned in their respective bearings 11, also said shaft is free from the stuffing box arrangement that appears in Fig. 11.

A further modification is shown in Fig. 21 which provides a grain chute entering the funneled end of the drum below the turning axis thereof, by which means the deposit of grain within the conical flange will avoid dropping the grain upon the shaft on which the drum rotates prior to entering between the spokes, and such other modifications may be employed as lie within the scope of the appended claims.

Having fully described my invention what I claim as new and desire to secure by Letters Patent is:

In a tempering machine for wheat or other grain, a casing, a drum and an auger trunnioned in the casing, one head of the drum being open, the other closed but having a series of openings adjacent the closed head and spaced therearound as an exit therefor, a chute to conduct grain through the open head into the drum, a gate and a flutter wheel positioned in the chute as a control for the flow of grain into the drum, there being a chute for the exit end of the drum and communicating with the auger and said exits whereby wheat is conducted to the auger, the trunnion for the drum being a hollow apertured shaft and rotatable with the drum, a steam pipe connected to the shaft as a supply for steam flow therethrough, a water supply pipe for the auger and a series of spray nozzles carried by the pipe in spaced relation above the auger, a water tank and a heating coil in the tank, a lateral connecting the coil to the steam pipe, a motor controlled valve for the lateral and said steam pipe, and a bulb and a temperature controller for the grain on its path from the drum to the auger, a bulb and temperature controller for the water in the tank, another drum rotatably mounted in the casing beneath the auger, and a chute as a conductor for grain from the auger to the drum, and in which the grain is dryed by evaporation and means to turn said drums, auger and flutter wheel simultaneously.

PERCY W. THOMAS.